(12) United States Patent
Ohashi

(10) Patent No.: US 12,306,008 B2
(45) Date of Patent: May 20, 2025

(54) ENVIRONMENTAL MAP MANAGEMENT APPARATUS, ENVIRONMENTAL MAP MANAGEMENT METHOD, AND PROGRAM

(71) Applicant: SONY INTERACTIVE ENTERTAINMENT INC., Tokyo (JP)

(72) Inventor: Yoshinori Ohashi, Tokyo (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 450 days.

(21) Appl. No.: 17/785,622

(22) PCT Filed: Jan. 24, 2020

(86) PCT No.: PCT/JP2020/002616
§ 371 (c)(1),
(2) Date: Jun. 15, 2022

(87) PCT Pub. No.: WO2021/149254
PCT Pub. Date: Jul. 29, 2021

(65) Prior Publication Data
US 2023/0021556 A1     Jan. 26, 2023

(51) Int. Cl.
*G01C 21/00* (2006.01)
(52) U.S. Cl.
CPC ........ *G01C 21/3811* (2020.08); *G01C 21/387* (2020.08)
(58) Field of Classification Search
None
See application file for complete search history.

(56) References Cited

U.S. PATENT DOCUMENTS 10,599,687 B2 * 3/2020 Oi .................... G06F 16/29
11,854,223 B2 * 12/2023 Hill .................... G06F 3/011
(Continued)

FOREIGN PATENT DOCUMENTS

JP    2006-053179 A    2/2006
JP    2006-227934 A    8/2006
(Continued)

OTHER PUBLICATIONS

Decision to Grant a Patent dated May 23, 2023, from Japanese Patent Application No. 2021-572243, 2 sheets.
(Continued)

*Primary Examiner* — Peter D Nolan
*Assistant Examiner* — Jacob Kent Besteman-Street
(74) *Attorney, Agent, or Firm* — XSENSUS LLP

(57) ABSTRACT

Provided are an environmental map management apparatus, an environmental map management method, and a program that can correct an environmental map to achieve an accurate association between the environmental map and a map indicated by given map data provided by a given map service. A common environmental map data storage unit (64) stores environmental map data that is generated based on sensing data acquired by a tracker and that indicates an environmental map. A pattern identification unit (68) identifies a predetermined pattern in the environmental map on the basis of the environmental map data. A corresponding element identification unit (70) identifies a linear element that appears in a map indicated by given map data provided by a given map service and that is associated with the predetermined pattern. A common environmental map data update unit (72) updates the environmental map data on the basis of a location of the linear element in the map indicated by the given map data.

14 Claims, 7 Drawing Sheets

(56) References Cited

U.S. PATENT DOCUMENTS

| | | | | |
|---|---|---|---|---|
| 2010/0105409 A1* | 4/2010 | Agarwal | ............... | H04W 64/00 |
| | | | | 455/456.1 |
| 2011/0313779 A1* | 12/2011 | Herzog | ................. | G06Q 30/02 |
| | | | | 715/744 |
| 2015/0087328 A1* | 3/2015 | Chao | ..................... | H04W 64/00 |
| | | | | 455/456.1 |
| 2017/0208109 A1* | 7/2017 | Akselrod | .............. | G06T 19/006 |
| 2018/0005450 A1* | 1/2018 | Daniels | ................. | G06V 20/20 |
| 2019/0385370 A1* | 12/2019 | Boyapalle | ............... | G06F 3/012 |
| 2020/0098135 A1* | 3/2020 | Ganjineh | ............. | G06V 20/588 |
| 2020/0302639 A1* | 9/2020 | Park | ........................ | G06T 7/246 |
| 2021/0327130 A1* | 10/2021 | Vahdat-Pajouh | ...... | G06V 20/20 |

FOREIGN PATENT DOCUMENTS

| | | |
|---|---|---|
| JP | 2013141049 A | 7/2013 |
| WO | 2011/118282 A1 | 9/2011 |
| WO | 2016/077506 A1 | 5/2016 |
| WO | 2019/167213 A1 | 9/2019 |

OTHER PUBLICATIONS

International Search Report and Written Opinion mailed Apr. 14, 2020, from PCT/JP2020/002616, 8 sheets.

* cited by examiner

ENVIRONMENTAL MAP MANAGEMENT APPARATUS, ENVIRONMENTAL MAP MANAGEMENT METHOD, AND PROGRAM

TECHNICAL FIELD

The present invention relates to an environmental map management apparatus, an environmental map management method, and a program.

BACKGROUND ART

In recent years, user-generated content (UGC) that is content generated by a plurality of users has been garnering attention.

Further, the simultaneous localization and mapping (SLAM) technology that creates environmental maps on the basis of sensing data acquired by trackers, such as images taken by cameras included in the trackers, has been known.

As an example of UGC using the SLAM technology, PTL 1 discloses an environmental map which is generated on the basis of sensing data acquired by each of a plurality of trackers and in which locations are expressed by a common coordinate system shared by the plurality of trackers.

Further, there are various map services that provide maps (including not only general maps but also satellite maps and aeronautical charts) to users via the Internet.

CITATION LIST

Patent Literature

PTL 1

PCT Patent Publication No. WO2019/167213

SUMMARY

Technical Problem

If a generated environmental map can accurately be associated with a map indicated by given map data provided by a given map service, a new service in which an environmental map and a map service are linked to each other can be developed. For example, a service that displays information in a map indicated by map data provided by a map service, such as anchors, local information, or store information, in a superimposed manner on the real world by using an X reality (XR) technology such as augmented reality (AR) can be realized. Further, for example, a service that reflects user operation using an XR technology in a map indicated by map data provided by a map service can be realized.

However, since an environmental map is UGC and thus generated on the basis of sensing data acquired by a plurality of individual trackers different from each other in accuracy, the environmental map is not accurate enough to be accurately associated with a map indicated by map data provided by a map service. Further, it cannot be said that the sensing accuracy of those trackers themselves is high enough to achieve an accurate association between a generated environmental map and a map indicated by map data provided by a map service. Thus, a generated environmental map cannot be successfully linked to a map service as it is.

The present invention has been made in view of such a problem and has an object to provide an environmental map management apparatus, an environmental map management method, and a program that can correct an environmental map to accurately associate the environmental map with a map indicated by given map data provided by a given map service.

Solution to Problem

In order to solve the problem described above, according to the present invention, there is provided an environmental map management apparatus including an environmental map data storage unit configured to store environmental map data that is generated based on sensing data acquired by a tracker and indicates an environmental map, a pattern identification unit configured to identify a predetermined pattern in the environmental map on the basis of the environmental map data, a corresponding element identification unit configured to identify a linear element that appears in a map indicated by given map data provided by a given map service and is associated with the pattern, and an environmental map data update unit configured to update the environmental map data on the basis of a location of the linear element in the map indicated by the given map data.

In one aspect of the present invention, the pattern identification unit identifies a linear portion in the environmental map on the basis of the environmental map data, and the corresponding element identification unit identifies a linear element that appears in the map indicated by the given map data and that is associated with the linear portion.

Further, in one aspect of the present invention, the environmental map data storage unit stores the environmental map data indicating the environmental map including a plurality of feature points, and the environmental map data update unit updates, based on the location of the linear element in the map indicated by the given map data, a location of at least one of the feature points in the environmental map.

In this aspect, the pattern identification unit may identify a linear set of feature points linearly disposed, from the plurality of feature points, the corresponding element identification unit may identify a linear element that appears in the map indicated by the given map data and that is associated with the linear set of feature points, and the environmental map data update unit may update, based on the location of the linear element in the map indicated by the given map data, a location of the linear set of feature points in the environmental map.

Further, the environmental map data update unit may update, based on locations of two of the feature points, the locations being updated based on the location of the linear element in the map indicated by the given map data, a location in the environmental map of one of the feature points disposed between the two of the feature points in the environmental map.

Further, in one aspect of the present invention, the environmental map data storage unit stores the environmental map data indicating the environmental map including a plurality of feature points, the pattern identification unit maps the plurality of feature points on a plane orthogonal to a gravity axis, to thereby generate mapping data indicating a set of feature points on the plane, and the pattern identification unit identifies the predetermined pattern on the basis of the mapping data.

Further, the environmental map data update unit may update at least one of a latitude, a longitude, an altitude, an orientation, or an elevation/depression angle of each of the feature points.

Further, the environmental map data may include a plurality of pieces of key frame data each generated based on the sensing data, the key frame data may include geo-pose data indicating a geographical location and an orientation of the tracker and a plurality of pieces of feature point data indicating relative locations, with respect to the location and the orientation indicated by the geo-pose data, of the feature points different from each other, the environmental map data update unit may identify the key frame data associated with the linear element as to-be-updated key frame data, and the environmental map data update unit may update, based on the location of the linear element in the map indicated by the given map data, the geo-pose data included in the to-be-updated key frame data.

In this aspect, the environmental map data may further include key frame link data for associating two pieces of the key frame data partially overlapping with each other in terms of sensing range by the tracker with each other, the environmental map data update unit may identify intermediate key frame data that is the key frame data associated with each of two pieces of the to-be-updated key frame data through one or a plurality of different pieces of the key frame link data, and the environmental map data update unit may update, based on the geo-pose data included in each of the two pieces of the to-be-updated key frame data, the geo-pose data included in the intermediate key frame data.

Moreover, the environmental map data update unit may identify an update amount of first geo-pose data that is the geo-pose data included in one of the pieces of the to-be-updated key frame data, the environmental map data update unit may identify an update amount of second geo-pose data that is the geo-pose data included in the other of the pieces of the to-be-updated key frame data, the environmental map data update unit may identify a first distance that is a distance from a location indicated by intermediate geo-pose data that is the geo-pose data included in the intermediate key frame data to a location indicated by the first geo-pose data, the environmental map data update unit may identify a second distance that is a distance from the location indicated by the intermediate geo-pose data to a location indicated by the second geo-pose data, and the environmental map data update unit may update the intermediate geo-pose data by an update amount that is a weighted average between the update amount of the first geo-pose data and the update amount of the second geo-pose data with weights based on the first distance and the second distance.

Further, the key frame data may further include public pose data indicating the location and the orientation of the tracker expressed in metric units, and the environmental map data update unit may update, based on the location of the linear element in the map indicated by the given map data, the geo-pose data and the public pose data included in the to-be-updated key frame data.

In this aspect, the environmental map data may further include key frame link data for associating two pieces of the key frame data partially overlapping with each other in terms of sensing range by the tracker with each other, the environmental map data update unit may identify intermediate key frame data that is the key frame data associated with each of two pieces of the to-be-updated key frame data through one or a plurality of different pieces of the key frame link data, and the environmental map data update unit may update, based on the geo-pose data included in each of the two pieces of the to-be-updated key frame data, the geo-pose data and the public pose data included in the intermediate key frame data.

Moreover, the environmental map data update unit may identify an update amount of first geo-pose data that is the geo-pose data included in one of the pieces of the to-be-updated key frame data, the environmental map data update unit may identify an update amount of second geo-pose data that is the geo-pose data included in the other of the pieces of the to-be-updated key frame data, the environmental map data update unit may identify a first distance that is a distance from a location indicated by intermediate geo-pose data that is the geo-pose data included in the intermediate key frame data to a location indicated by the first geo-pose data, the environmental map data update unit may identify a second distance that is a distance from the location indicated by the intermediate geo-pose data to a location indicated by the second geo-pose data, the environmental map data update unit may update the intermediate geo-pose data by an update amount that is a weighted average between the update amount of the first geo-pose data and the update amount of the second geo-pose data with weights based on the first distance and the second distance, and the environmental map data update unit may update the public pose data included in the intermediate key frame data by an update amount depending on the update amount of the intermediate geo-pose data included in the intermediate key frame data.

Further, the geo-pose data may indicate at least one of a latitude, a longitude, an altitude, an orientation, or an elevation/depression angle of the tracker.

Further, according to the present invention, there is provided an environmental map management method including a step of identifying, based on environmental map data that is generated based on sensing data acquired by a tracker and indicates an environmental map, a predetermined pattern in the environmental map, a step of identifying a linear element that appears in a map indicated by given map data provided by a given map service and is associated with the pattern, and a step of updating the environmental map data on the basis of a location of the linear element in the map indicated by the given map data.

Further, according to the present invention, there is provided a program for causing a computer to execute a procedure of identifying, based on environmental map data that is generated based on sensing data acquired by a tracker and indicates an environmental map, a predetermined pattern in the environmental map, a procedure of identifying a linear element that appears in a map indicated by given map data provided by a given map service and is associated with the pattern, and a procedure of updating the environmental map data on the basis of a location of the linear element in the map indicated by the given map data.

DESCRIPTION OF EMBODIMENT

Now, an embodiment of the present invention is described in detail with reference to the drawings.

Figure 1:
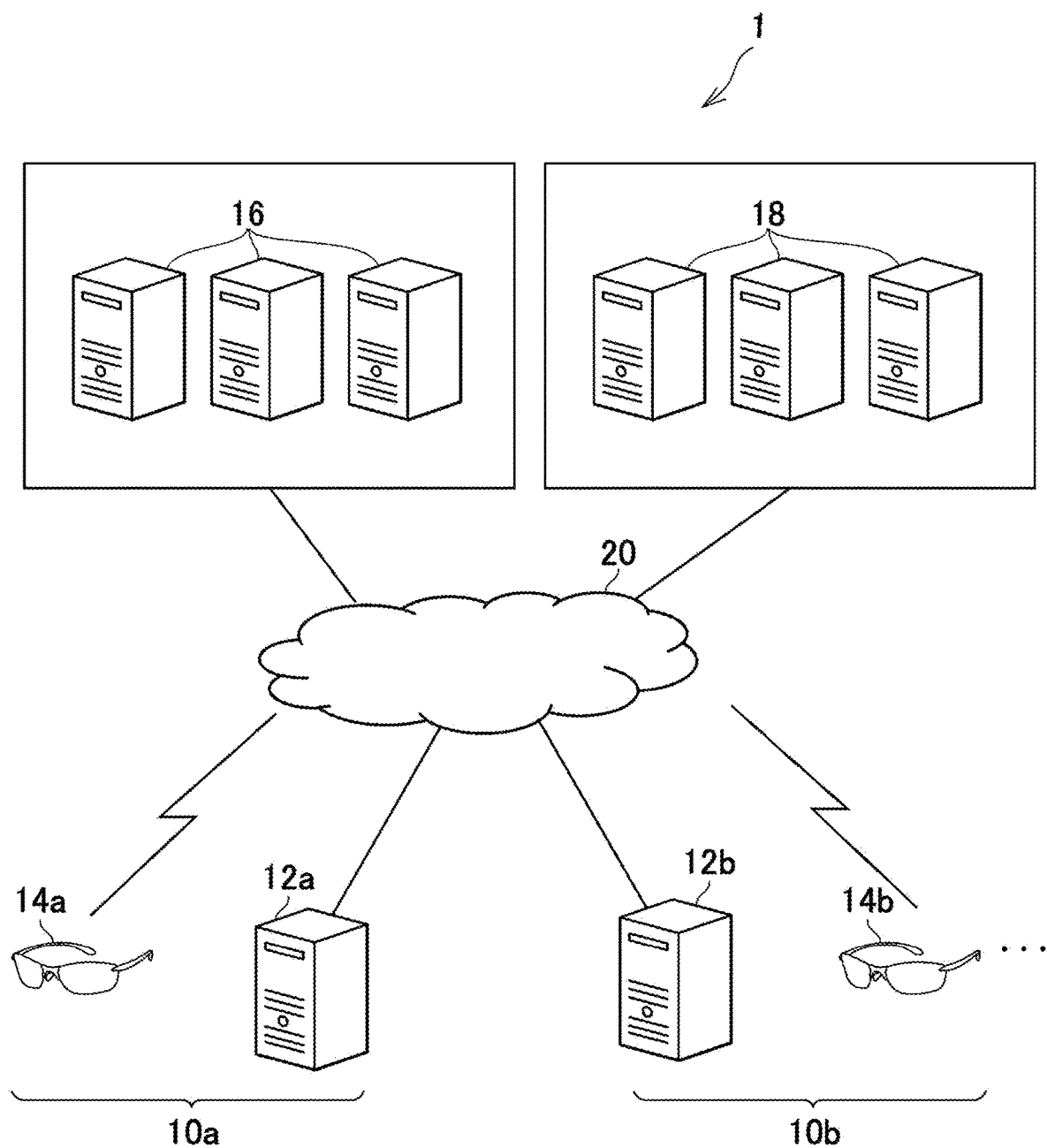
FIG. 1 is a configuration diagram illustrating an example of an environmental map management system according to an embodiment of the present invention.

FIG. 1 is a configuration diagram illustrating an example of an environmental map management system 1 according to the embodiment of the present invention. As illustrated in FIG. 1, the environmental map management system 1 according to the present embodiment includes a plurality of user systems 10. Further, the user system 10 according to the present embodiment includes a user server 12 and a tracker 14. In FIG. 1, two user systems 10a and 10b are exemplified. The user system 10a includes a user server 12a and a tracker 14a. The user system 10b includes a user server 12b and a tracker 14b. Further, the environmental map management system 1 according to the present embodiment also includes a common server 16 and a map service 18.

In the present embodiment, for example, a plurality of users who use the environmental map management system 1 each manage the user's own user system 10. Further, each user cannot access the user systems 10 managed by the other users.

The user server 12, the tracker 14, the common server 16, and the map service 18 are connected to a computer network 20 such as the Internet. Further, in the present embodiment, the user server 12, the common server 16, and the map service 18 are able to communicate with each other. Further, in the present embodiment, the user server 12 included in the user system 10 and the tracker 14 included in the user system 10 in question are able to communicate with each other.

The user server 12 according to the present embodiment is a server computer that the user of the environmental map management system 1 uses, for example. Note that the user server 12 is not required to be a server operated by the user himself/herself and may be a cloud server operated by a cloud service provider, for example.

Figure 2A:
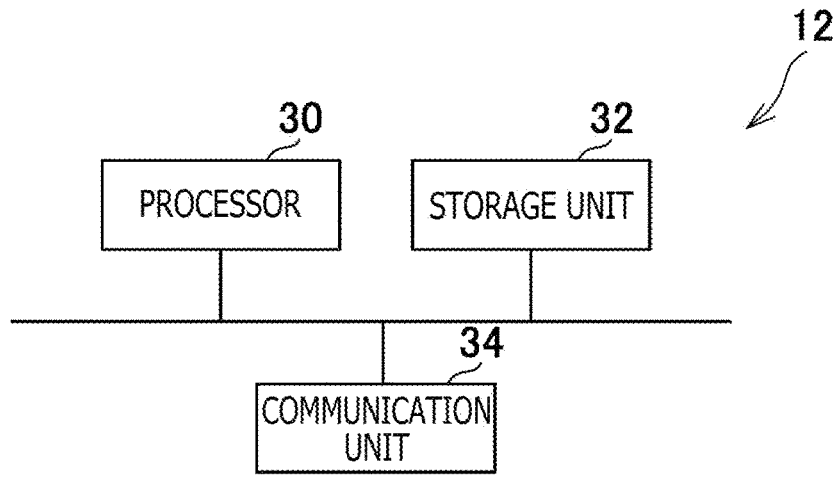
FIG. 2A is a configuration diagram illustrating an example of a user server according to the embodiment of the present invention.

As illustrated in FIG. 2A, the user server 12 according to the present embodiment includes a processor 30, a storage unit 32, and a communication unit 34. The processor 30 is a program control device such as a central processing unit (CPU) configured to operate according to programs installed on the user server 12, for example. The storage unit 32 is a storage element such as a read only memory (ROM) or a random access memory (RAM) or a solid-state drive, for example. The storage unit 32 stores, for example, programs that are executed by the processor 30. The communication unit 34 is a communication interface such as a network board or a wireless local area network (LAN) module.

The tracker 14 according to the present embodiment is an apparatus configured to track the user wearing the tracker 14 in question in terms of location and which direction the user is facing.

Figure 2B:
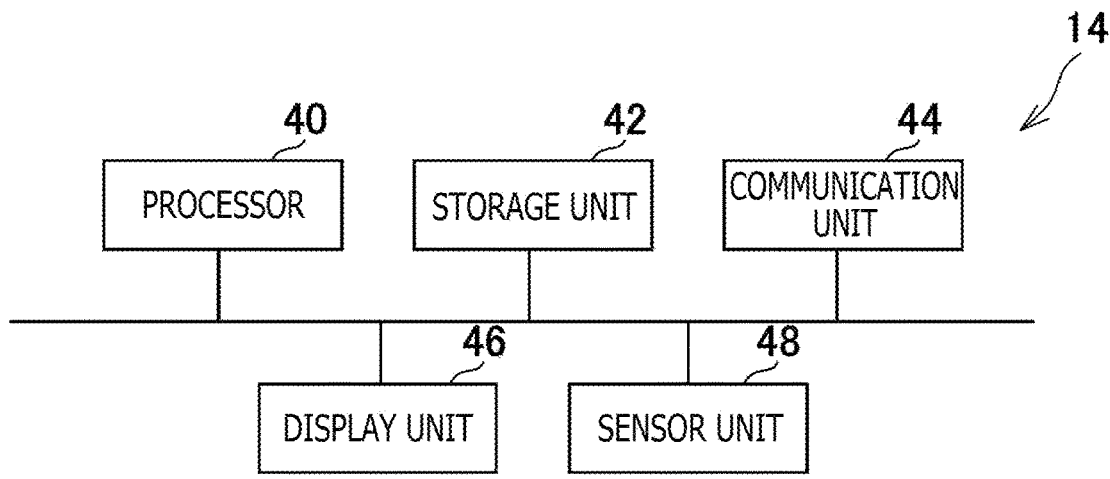
FIG. 2B is a configuration diagram illustrating an example of a tracker according to the embodiment of the present invention.

As illustrated in FIG. 2B, the tracker 14 according to the present embodiment includes a processor 40, a storage unit 42, a communication unit 44, a display unit 46, and a sensor unit 48.

The processor 40 is a program control device such as a microprocessor configured to operate according to programs installed on the tracker 14, for example. The storage unit 42 is a storage element such as a ROM or a RAM, for example. The storage unit 42 stores, for example, programs that are executed by the processor 40. The communication unit 44 is a communication interface such as a wireless LAN module.

The display unit 46 is a display such as a liquid crystal display or organic electroluminescent (EL) display disposed on the front side of the tracker 14. The display unit 46 according to the present embodiment displays left-eye images and right-eye images, thereby being capable of displaying three-dimensional images, for example. Note that the display unit 46 may not support three-dimensional image display and only support two-dimensional image display.

The sensor unit 48 includes sensors such as a camera, an inertial sensor (IMU), a geomagnetic sensor (azimuth sensor), a gyrocompass, a global positioning system (GPS) module, a depth sensor, and an altitude sensor.

The camera included in the sensor unit 48 takes images at a predetermined sampling rate, for example. The camera included in the sensor unit 48 may be capable of taking three-dimensional images or depth images.

Further, the geomagnetic sensor or the gyrocompass included in the sensor unit 48 outputs, to the processor 30, data indicating the orientation of the tracker 14, at a predetermined sampling rate.

Further, the inertial sensor included in the sensor unit 48 outputs, to the processor 40, data indicating the acceleration, the rotation amount, the movement amount, or the like of the tracker 14, at a predetermined sampling rate.

Further, the GPS module included in the sensor unit 48 outputs, to the processor 40, data indicating the latitude and the longitude of the tracker 14, at a predetermined sampling rate.

The depth sensor included in the sensor unit 48 is a depth sensor using time of flight (ToF), patterned stereo, or structured light, for example. The depth sensor in question outputs, to the processor 40, data indicating the distance from the tracker 14, at a predetermined sampling rate.

Further, the altitude sensor included in the sensor unit 48 outputs, to the processor 40, data indicating the altitude of the tracker 14, at a predetermined sampling rate.

Further, the sensor unit 48 may include another sensor such as a radio frequency (RF) sensor, an ultrasonic sensor, or an event-driven sensor.

Note that the tracker 14 according to the present embodiment may include, for example, input-output ports such as High-Definition Multimedia Interface (HDMI) (registered trademark) ports, universal serial bus (USB) ports, or auxiliary (AUX) ports, headphones, or speakers.

The common server 16 according to the present embodiment is a server computer such as a cloud server that is used by all the users who use the environmental map management system 1, for example. All the user systems 10 included in the environmental map management system 1 are allowed to access the common server 16 according to the present embodiment.

Figure 2C:
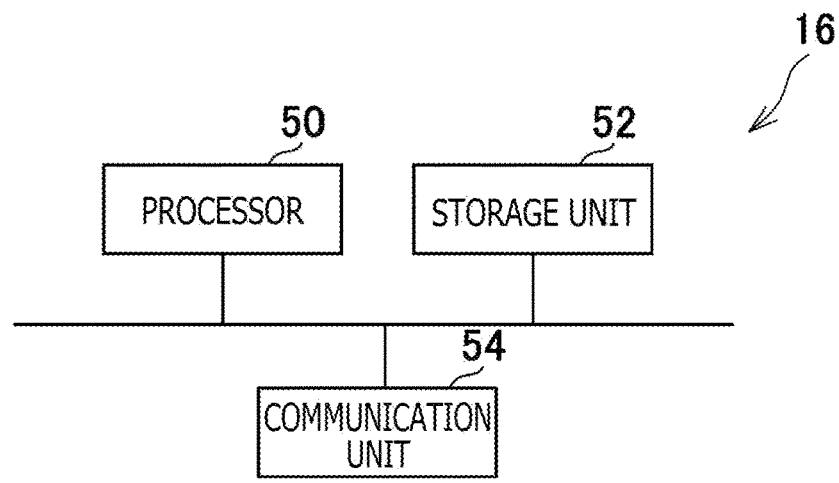
FIG. 2C is a configuration diagram illustrating an example of a common server according to the embodiment of the present invention.

As illustrated in FIG. 2C, the common server 16 according to the present embodiment includes a processor 50, a storage unit 52, and a communication unit 54. The processor 50 is a program control device such as a CPU configured to operate according to programs installed on the common server 16, for example. The storage unit 52 is a storage element such as a ROM or a RAM or a solid-state drive, for example. The storage unit 52 stores, for example, programs that are executed by the processor 50. The communication unit 54 is a communication interface such as a network board or a wireless LAN module.

The map service 18 according to the present embodiment includes server computers such as cloud servers managed by an existing map service provider, for example, and provides given map data to the users. The map data provided by the map service 18 is not limited to map data indicating a general map. The map service 18 may provide map data indicating an aeronautical chart (aerial image) or a satellite map (satellite image). A map indicated by the map data provided by the map service 18 according to the present embodiment is a three-dimensional map that expresses the latitude, the longitude, the altitude, and the directions, for example. Note that the map indicated by the map data provided by the map service 18 may be a two-dimensional map that expresses the latitude, the longitude, and the directions, for example.

In the present embodiment, sensing data acquired by the tracker 14 included in the user system 10 is transmitted to the user server 12 included in the user system 10 in question. In the present embodiment, for example, sensing data acquired by the processor 40 on the basis of sensing by the sensor unit 48 is transmitted to the user server 12.

The sensing data to be transmitted may include images taken by the camera included in the sensor unit 38 of the tracker 14, for example.

Further, the sensing data to be transmitted may include depth data measured by the camera or the depth sensor included in the sensor unit 38 of the tracker 14.

Further, the sensing data to be transmitted may include data indicating the orientation of the tracker 14 measured by the geomagnetic sensor or the gyrocompass included in the sensor unit 38 of the tracker 14.

Further, the sensing data to be transmitted may include data indicating the acceleration, the rotation amount, the movement amount, or the like of the tracker 14 measured by the inertial sensor included in the sensor unit 38.

Further, the sensing data to be transmitted may include data indicating the latitude and the longitude of the tracker 14 measured by the GPS module included in the sensor unit 38.

Further, the sensing data to be transmitted may include data indicating the altitude measured by the altitude sensor included in the sensor unit 38.

Further, the sensing data to be transmitted may include a set of feature points (key frame).

Note that, to enhance the accuracy of the latitude and the longitude indicated by sensing data, the tracker 14 may utilize location estimation services using hotspots, the identifiers of 5G mobile edge servers, or the like.

Figure 3:
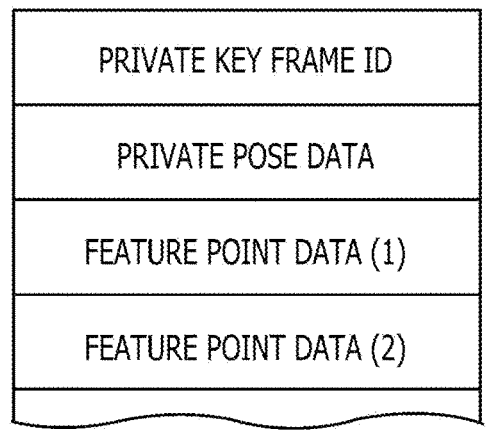
FIG. 3 is a diagram illustrating an exemplary data structure of private key frame data.

Then, the user server 12 executes, on the basis of the sensing data transmitted from the tracker 14, SLAM processing including generation of private key frame data having a data structure exemplified in FIG. 3. Here, the SLAM processing to be executed may include, for example, relocalization processing, loop closing processing, three-dimensional (3D) mesh processing, or object recognition processing.

Further, the SLAM processing may include plane detection/3D mesh segmentation processing. The plane detection/3D mesh segmentation processing refers to processing of detecting a continuous plane such as the ground or walls and dividing the 3D mesh of the whole scene into individual 3D meshes such as the ground, buildings, and trees. Moreover, the SLAM processing may include 3D mesh optimization processing. The 3D mesh optimization processing refers to processing of removing portions possibly corresponding to moving bodies or errors due to noise or the like from a 3D mesh, reducing the number of polygons, or smoothing the surface of the mesh. In addition, the SLAM processing may include texture generation processing. The texture generation processing refers to processing of generating a texture image corresponding to a 3D mesh, on the basis of the colors of the vertices of the mesh.

Further, the user server 12 may execute environmental map generation processing based on the sensing data transmitted from the tracker 14.

Then, the user server 12 uploads the generated private key frame data onto the common server 16. Here, private key frame data on private space such as the user's home may not be uploaded onto the common server 16.

FIG. 3 is a diagram illustrating an exemplary data structure of private key frame data according to the present embodiment. As illustrated in FIG. 3, the private key frame data includes a private key frame identification (ID), private pose data, and a plurality of pieces of feature point data (feature point data (1), feature point data (2), etc.). The private key frame data according to the present embodiment is data that is associated with sensing data to be transmitted from the tracker 14 to the user server 12, for example.

A private key frame ID included in private key frame data is identification information regarding the private key frame data.

Private pose data included in private key frame data is data indicating the location and the orientation of the tracker 14 which have been detected when sensing associated with the private key frame data in question has been performed. The location and the orientation indicated by private pose data are expressed by a coordinate system unique to the user system 10 that generates the private key frame data in question.

Feature point data included in private key frame data is data indicating the attributes of feature points such as the locations of the feature points identified on the basis of sensing data acquired by the tracker 14. In the present embodiment, private key frame data includes a plurality of pieces of feature point data associated with feature points different from each other. Here, for example, private key frame data includes as many pieces of feature point data as feature points identified by the tracker 14 performing sensing once. Feature point data included in private key frame data includes, for example, the three-dimensional coordinate values (for example, an X-coordinate value, a Y-coordinate value, and a Z-coordinate value) of the relative location of a feature point corresponding to the feature point data in question with respect to the location and the orientation indicated by private pose data included in the private key frame data in question. Further, feature point data includes color information indicating the colors of the surroundings of a feature point corresponding to the feature point data in question.

Note that private key frame data may include, in addition to the data described above, sensing data transmitted from the tracker 14, for example.

The common server 16 generates, on the basis of private key frame data uploaded from the user server 12, common environmental map data indicating an environmental map shared by the plurality of users.

As described below, common environmental map data according to the present embodiment includes geo-key frame data and key frame link data.

Geo-key frame data is data that is associated with private key frame data to be transmitted from the user server 12 to the common server 16. Thus, through private key frame data, geo-key frame data is associated with sensing data to be transmitted from the tracker 14 to the user server 12.

Figure 4:
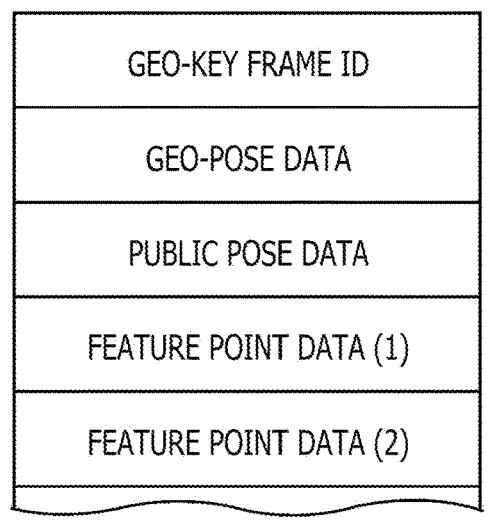
FIG. 4 is a diagram illustrating an exemplary data structure of geo-key frame data.

FIG. 4 is a diagram illustrating an exemplary data structure of geo-key frame data according to the present embodiment. As illustrated in FIG. 4, the geo-key frame data includes a geo-key frame ID, geo-pose data, public pose data, and a plurality of pieces of feature point data (feature point data (1), feature point data (2), etc.).

A geo-key frame ID included in geo-key frame data is identification information regarding the geo-key frame data.

Geo-pose data included in geo-key frame data is data indicating the geographical location and orientation of the tracker 14 which are detected when sensing data to be associated with the geo-key frame data in question is generated, for example. The geo-pose data is data indicating the latitude, the longitude, the altitude, the orientation, and the elevation/depression angle of the tracker 14 which are detected when sensing data to be associated with the geo-key frame data in question is generated, for example.

In generating new geo-key frame data, values indicating the latitude, the longitude, the altitude, the orientation, and the elevation/depression angle roughly estimated on the basis of sensing data included in private key frame data may be set to geo-pose data.

Note that geo-pose data may not indicate all the latitude, longitude, altitude, orientation, and elevation/depression angle of the tracker 14. Geo-pose data may indicate at least one of the latitude, the longitude, the altitude, the orientation, or the elevation/depression angle of the tracker 14.

Further, with the use of an image recognition technology or the like, a predetermined landmark may be detected from an image taken by the tracker 14. Then, with reference to the map provided by the map service 18, the geographical location of the landmark in question, such as the latitude and the longitude, may be identified. Then, a value indicating the geographical location identified in such a way may be set to geo-pose data.

Note that, in generating new geo-key frame data, the value of geo-pose data is not necessarily required to be set.

To feature point data included in geo-key frame data, the value of feature point data included in private key frame data associated with the geo-key frame data in question is set. Thus, feature point data included in geo-key frame data includes, for example, the three-dimensional coordinate values of the relative location of a feature point corresponding to the feature point data in question with respect to the location and the orientation indicated by geo-pose data included in the geo-key frame data in question.

Public pose data included in geo-key frame data is data indicating the location and the orientation of the tracker 14 which are detected when sensing data to be associated with the geo-key frame data in question is generated. Unlike private pose data, the location and the orientation indicated by public pose data are expressed by a coordinate system common to the plurality of user systems 10. In the following, a coordinate system common to the plurality of user systems 10 is referred to as a "common coordinate system." In public pose data, locations are expressed in metric units, for example.

Here, for example, as described in PTL 1, a set of feature points (point cloud) that is the union of feature points indicated by geo-key frame data registered in the common server 16 in advance and a feature point indicated by feature point data included in new geo-key frame data may be collated with each other. Then, on the basis of the result of collation, the value of public pose data included in the new geo-key frame data may be determined.

Note that the geo-key frame data according to the present embodiment may include sensing data included in private key frame data associated with the geo-key frame data in question.

In the present embodiment, in generating new geo-key frame data, key frame link data for associating two pieces of geo-key frame data corresponding to partially overlapping sensing ranges with each other is also generated. Here, for example, a right rectangular pyramid-shaped region in predetermined shape and size which has, as its vertex, the location of the tracker 14 detected when sensing data to be associated with geo-key frame data is generated and in which a line that passes through the vertex and extends along the orientation of the tracker 14 in question is orthogonal to the base may be identified. Then, the right rectangular pyramid-shaped region identified in such a way may be identified as a sensing range corresponding to the geo-key frame data in question.

Figure 5:
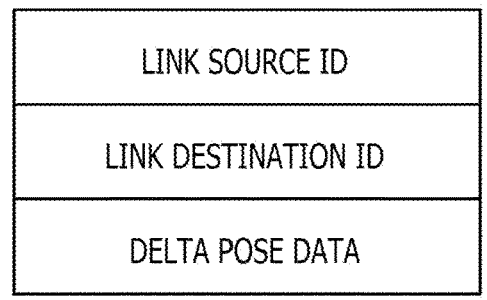
FIG. 5 is a diagram illustrating an exemplary data structure of key frame link data.

FIG. 5 is a diagram illustrating an exemplary data structure of key frame link data according to the present embodiment.

As illustrated in FIG. 5, the key frame link data includes a link source ID, a link destination ID, and delta pose data.

In the present embodiment, for example, when new geo-key frame data has been generated, other geo-key frame data partially overlapping with the geo-key frame data in question in terms of sensing range is retrieved. Here, for example, other geo-key frame data corresponding to a feature point partially overlapping with a feature point indicated by the geo-key frame data may be retrieved. Then, new key frame link data having the geo-key frame ID of the retrieved geo-key frame data as its link source ID and the geo-key frame ID of the generated geo-key frame data as its link destination ID is generated.

Then, the relative value of the public pose data of the geo-key frame data identified by the link destination ID, the relative value using the value of the public pose data of the geo-key frame data identified by the link source ID as a reference, is identified. Then, the identified value is set as the value of the delta pose data of the new key frame link data in question.

Figure 6:
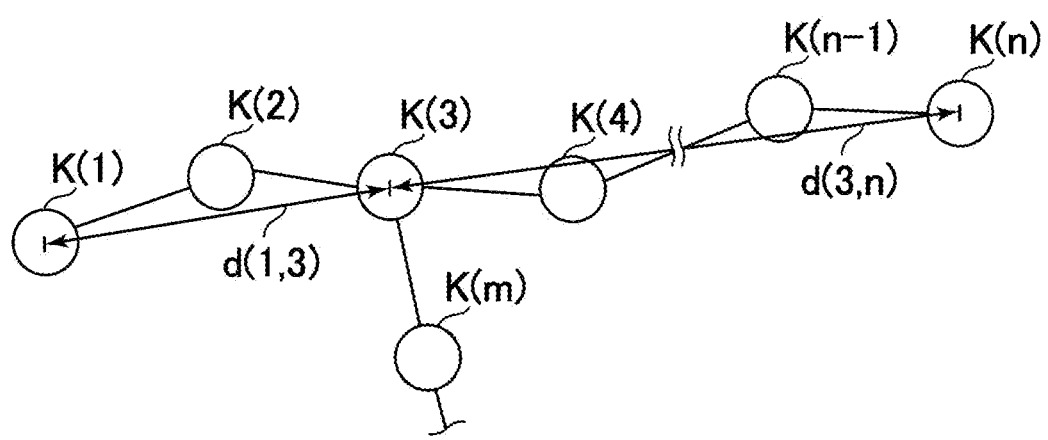
FIG. 6 is a diagram schematically illustrating an exemplary graph representing pieces of geo-key frame data associated with each other by key frame link data.

FIG. 6 is a diagram schematically illustrating an exemplary graph representing pieces of geo-key frame data associated with each other by key frame link data. In the example of FIG. 6, geo-key frame data is expressed by nodes (K(1) to K(n) and K(m)) and key frame link data is expressed by the links.

In such a way, on the basis of private key frame data uploaded from the various user systems 10 onto the common server 16, a plurality of pieces of geo-key frame data associated with each other are generated. With a set of feature points (point cloud) indicated by the plurality of pieces of geo-key frame data accumulated in the common server 16 as described above, an environmental map which is UGC and in which the location of each feature point is expressed by the common coordinate system is constructed.

In the following, an environmental map constructed as described above is referred to as a "common environmental map." Note that a common environmental map may be referred to in the SLAM processing that is executed in the user server 12.

If a generated common environmental map can be accurately associated with the map indicated by the map data provided by the map service 18, a new service in which a common environmental map and the map service 18 are linked to each other can be developed. For example, a service that displays information in the map indicated by the map data provided by the map service 18, such as anchors, local information, or store information, in a superimposed manner on the real world by using an XR technology such as AR can be realized. Further, for example, a service that reflects user operation using an XR technology in the map indicated by the map data provided by the map service 18 can be realized.

However, since a common environmental map generated as described above is generated on the basis of sensing data acquired by the plurality of individual trackers 14, the common environmental map is not accurate enough to be accurately associated with the map indicated by the map data provided by the map service 18. Further, it cannot be said that the sensing accuracy of those trackers 14 themselves is high enough to achieve an accurate association between a generated common environmental map and the map indicated by the map data provided by the map service 18. Thus, a generated common environmental map cannot be successfully linked to the map service 18 as it is.

Accordingly, the present embodiment makes it possible to correct a common environmental map to achieve an accurate association between the common environmental map and the map indicated by the given map data provided by the given map service 18, as described below.

Now, the functions of the common server 16 according to the present embodiment and processing that is executed in the common server 16 are further described.

Figure 7:
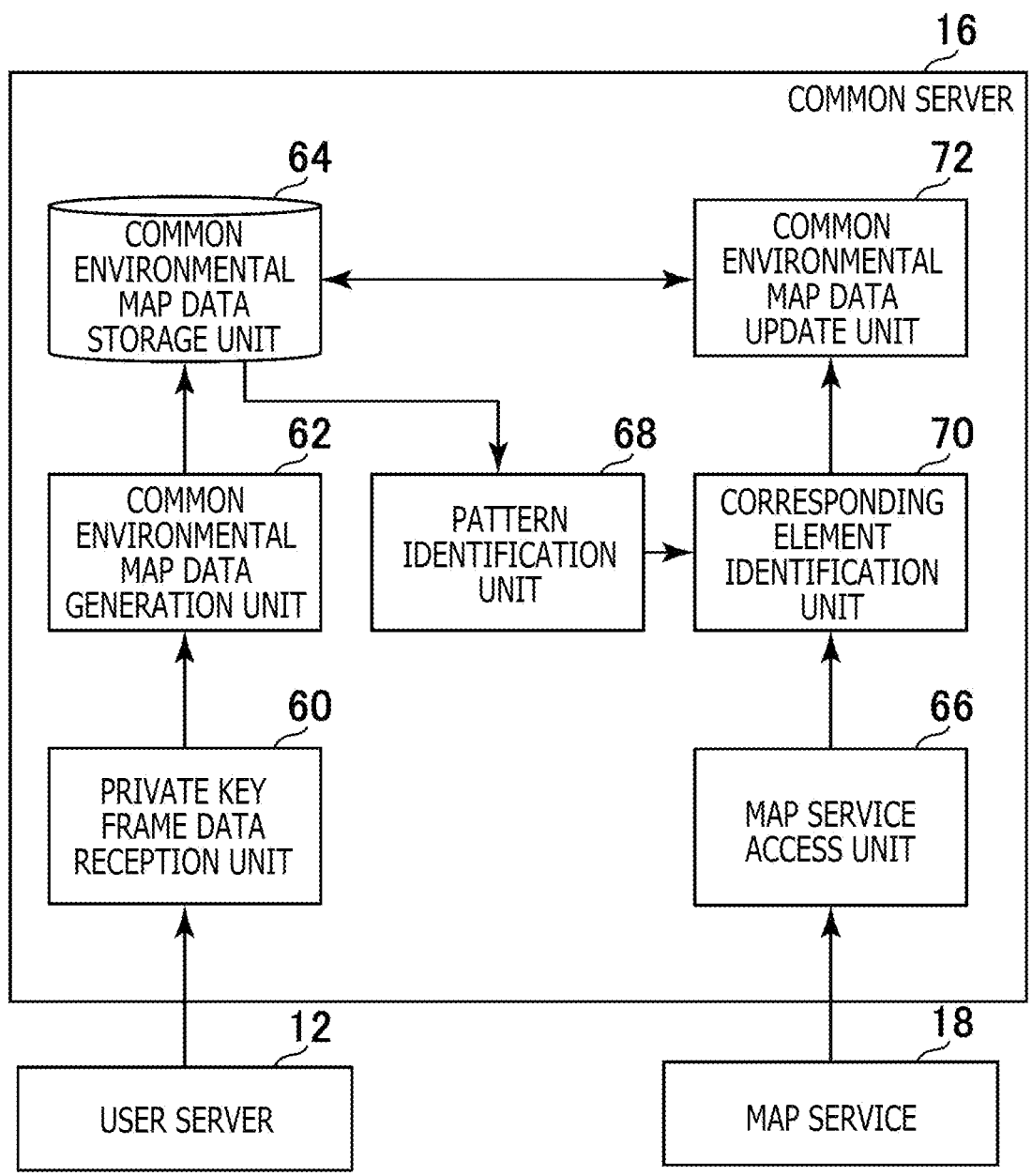
FIG. 7 is a functional block diagram illustrating exemplary functions that are implemented in the common server according to the embodiment of the present invention.

FIG. 7 is a functional block diagram illustrating exemplary functions that are implemented in the common server 16 according to the present embodiment. Note that, in the common server 16 according to the present embodiment, not all the functions illustrated in FIG. 7 are required to be implemented and functions other than the functions illustrated in FIG. 7 may be implemented.

As illustrated in FIG. 7, the common server 16 functionally includes, for example, a private key frame data reception unit 60, a common environmental map data generation unit 62, a common environmental map data storage unit 64, a map service access unit 66, a pattern identification unit 68, a corresponding element identification unit 70, and a common environmental map data update unit 72. The private key frame data reception unit 60 and the map service access unit 66 are implemented by using the communication unit 54 as their main parts. The common environmental map data generation unit 62, the pattern identification unit 68, the corresponding element identification unit 70, and the common environmental map data update unit 72 are implemented by using the processor 50 as their main parts. The common environmental map data storage unit 64 is implemented by using the storage unit 52 as its main part.

The functions described above may be implemented by the processor 50 executing a program that is installed on the common server 16 which is a computer and that includes instructions corresponding to the functions described above. This program may be supplied to the common server 16 through a computer readable information storage medium such as an optical disc, a magnetic disk, a magnetic tape, a magneto-optical disk, or a flash memory, or through the Internet or the like.

The private key frame data reception unit 60 of the present embodiment receives private key frame data from the user server 12, for example.

The common environmental map data generation unit 62 of the present embodiment generates, on the basis of sensing data acquired by the tracker 14, common environmental map data indicating a common environmental map that is an environmental map shared by the plurality of users, for example. As described above, a common environmental map includes a plurality of feature points. In the present embodiment, for example, common environmental map data is generated on the basis of private key frame data received by the private key frame data reception unit 60. The common environmental map data according to the present embodiment includes a plurality of pieces of geo-key frame data and a plurality of pieces of key frame link data. Then, the common environmental map data generation unit 62 cause the common environmental map data storage unit 64 to store therein the common environmental map data generated as described above.

The common environmental map data storage unit 64 of the present embodiment stores the common environmental map data described above, for example.

The map service access unit 66 of the present embodiment accesses the given map service 18, thereby acquiring the given map data to be linked to a common environmental map, for example. In the following, the map indicated by the given map data provided by the given map service 18 to be linked to a common environmental map is referred to as a "corresponding map."

The pattern identification unit 68 of the present embodiment identifies, on the basis of common environmental map data stored in the common environmental map data storage unit 64, a predetermined pattern in an environmental map indicated by the common environmental map data in question, for example. The pattern identification unit 68 may identify, on the basis of common environmental map data stored in the common environmental map data storage unit 64, a linear portion in an environmental map indicated by the common environmental map data in question. In the following, a linear portion identified as described above is referred to as a "linear portion of interest." Note that a linear portion according to the present embodiment is not limited to a straight portion representing a straight road or the like. The linear portion according to the present embodiment may be a curved portion representing a curve or the like.

For example, the pattern identification unit 68 may generate a set of feature points (point cloud) on the basis of a plurality of pieces of geo-key frame data stored in the common environmental map data storage unit 64. For example, a set of feature points that is the union of feature points indicated by the plurality of respective pieces of geo-key frame data may be generated. Then, the pattern identification unit 68 may identify, by using the Hough transform technology or the like, a linear set of feature points linearly disposed, from the set of feature points generated as described above. Then, the pattern identification unit 68 may identify a line formed by the identified linear set of feature points as a linear portion of interest.

Further, for example, with the use of a pattern matching technology, sets of feature points corresponding to buildings may be extracted from the generated set of feature points. Then, a linear blank space in the common environmental map between the sets of feature points corresponding to the buildings extracted as described above may be identified as a linear portion of interest.

Moreover, in a case where the geo-key frame data includes an image taken by the tracker 14, a road region in the common environmental map may be identified on the basis of the image in question by using deep learning or the like. Then, the road region identified as described above may be identified as a linear portion of interest.

In addition, for example, a trail along which the user is estimated to have walked in the common environmental map may be identified as a linear portion of interest. For example, a linear region identified on the basis of the geo-key frame data as having been passed by the tracker 14 may be identified as a linear portion of interest.

Here, for example, a linear region that has been passed by a predetermined number or more of the trackers 14 may be identified as a linear portion of interest.

Further, the pattern identification unit 68 may map a plurality of feature points included in an environmental map stored in the common environmental map data storage unit 64 on a plane orthogonal to the gravity axis, to thereby generate mapping data indicating a set of feature points on the plane in question. For example, the pattern identification unit 68 may map a set of feature points generated on the basis of a plurality of pieces of geo-key frame data stored in the common environmental map data storage unit 64 on a horizontal plane (ground) orthogonal to the gravity axis, to thereby generate mapping data indicating a set of feature points on the plane.

Then, the pattern identification unit 68 may identify a predetermined pattern on the basis of the mapping data generated as described above. For example, a linear set of feature points linearly disposed may be identified from the set of feature points indicated by the mapping data. Then, a line formed by the identified linear set of feature points may be identified as a linear portion of interest. Alternatively, sets of feature points corresponding to buildings may be extracted from the set of feature points indicated by the mapping data. Then, a linear blank space in the common environmental map between the sets of feature points corresponding to the buildings extracted as described above may be identified as a linear portion of interest. Such processing as described above makes it greatly easy to associate a corresponding element described below and a predetermined pattern such as a linear set of feature points with each other, in a case where a corresponding map is a two-dimensional map.

The corresponding element identification unit 70 of the present embodiment identifies a linear element that appears in the corresponding map and that is associated with the predetermined pattern described above, for example. The corresponding element identification unit 70 may identify, by shape matching or pattern matching, a linear element that appears in the corresponding map and that is associated with a linear portion of interest. In the following, a linear element identified as described above is referred to as a "corresponding element." For example, a road that is associated with a linear portion of interest identified by the pattern identification unit 68 and appears in the corresponding map is identified as a corresponding element. Here, for example, the corresponding element identification unit 70 may identify a corresponding element associated with a linear set of feature points identified by the pattern identification unit 68. Note that a corresponding element according to the present embodiment is not limited to a straight element representing a straight road or the like, like the linear portion described above. The corresponding element according to the present embodiment may be a curved element representing a curve or the like.

Further, the corresponding map may be a map in which road information indicating where roads run is expressed. Moreover, the pattern identification unit 68 may estimate, on the basis of common environmental map data stored in the common environmental map data storage unit 64, a road in an environmental map indicated by the common environmental map data in question. Then, the corresponding element identification unit 70 may identify a road associated with the road in the environmental map and expressed by road information in the corresponding map as a corresponding element.

The common environmental map data update unit 72 of the present embodiment updates common environmental map data stored in the common environmental map data storage unit 64, on the basis of the location of a corresponding element in the corresponding map, the corresponding element being identified by the corresponding element identification unit 70, for example.

The common environmental map data update unit 72 may update the location of at least one feature point in a common environmental map on the basis of the location of a corresponding element in the corresponding map, the corresponding element being identified by the corresponding element identification unit 70. Here, the common environmental map data update unit 72 may update at least one of the latitude, the longitude, the altitude, the orientation, or the elevation/depression angle of the feature point.

Further, the common environmental map data update unit 72 may update, on the basis of the location of a corresponding element in the corresponding map, the corresponding element being identified by the corresponding element identification unit 70, the location in a common environmental map of a linear set of feature points identified by the pattern identification unit 68.

In the present embodiment, the corresponding element identification unit 70 may identify corresponding elements in geo-key frame data units and the common environmental map data update unit 72 may update common environmental map data in geo-key frame data units.

For example, the corresponding element identification unit 70 may identify geo-key frame data corresponding to a sensing range that covers whole or part of a linear portion of interest as to-be-updated geo-key frame data to be updated. Then, the corresponding element identification unit 70 may narrow down, on the basis of geo-pose data included in the to-be-updated geo-key frame data, a region, in the corresponding map, to be subjected to matching with the geo-key frame data in question. Here, for example, the region to be subjected to matching may be narrowed down to a region of 10 meters square around a location indicated by the geo-pose data.

Then, in the region in the corresponding map that has been narrowed down, matching may be performed with the linear portion of interest in the sensing range corresponding to the to-be-updated geo-key frame data to identify a corresponding element corresponding to the linear portion of interest in question.

Then, the common environmental map data update unit 72 may update the geo-pose data included in the to-be-updated geo-key frame data, on the basis of the location of the corresponding element in the corresponding map. For example, the common environmental map data update unit 72 may update the geo-pose data included in the to-be-updated geo-key frame data in such a manner that the location of the linear portion of interest is matched with the location of the corresponding element in the corresponding map.

Here, for example, the common environmental map data update unit 72 may update the geo-pose data included in the to-be-updated geo-key frame data to a value determined by using an optimization method such as the least squares method. More specifically, for example, the common environmental map data update unit 72 may identify a plurality of points on the linear portion of interest in the sensing range corresponding to the to-be-updated geo-key frame data. Then, the common environmental map data update unit 72 may identify, on the basis of the geo-pose data included in the geo-key frame data, a plurality of points to be identified mapped in the corresponding map. Then, the common environmental map data update unit 72 may determine a geo-pose data value that achieves the minimum sum of squares of the distance to the corresponding element associated with the linear portion of interest with respect to the plurality of points mapped in the corresponding map. Then, the common environmental map data update unit 72 may update the geo-pose data included in the geo-key frame data to the determined value. With the update of the geo-pose data, the location of at least one feature point in the common environmental map, such as the location of a linear set of feature points in the common environmental map, is updated as a result.

Further, to achieve a match with the update of the geo-pose data included in the to-be-updated geo-key frame data, the common environmental map data update unit 72 also updates public pose data included in the to-be-updated geo-key frame data in question. In updating the public pose data, processing of converting geo-pose data values expressed by the latitude, the longitude, the altitude, and the like to public pose data values expressed in metric units is executed. In this case, a conversion with a conversion expression taking the fact that a length per longitude varies depending on the latitude into consideration is required to be executed. Note that the orientation of the tracker 14 indicated by public pose data is not required to be updated on the basis of an orientation update amount indicated by geo-pose data and may be updated in such a manner that a specific direction (for example, the north) in the corresponding map and the direction of a predetermined axis (for example, an X axis or a Y axis) indicated by the public pose data are matched with each other. Further, the common environmental map data update unit 72 also updates delta pose data included in key frame link data having the geo-key frame ID of the to-be-updated geo-key frame data in question as its link source ID or link destination ID.

Note that it is possible that as a result of the matching described above, no corresponding element associated with the linear portion of interest in the sensing range corresponding to the to-be-updated geo-key frame data can be identified. Further, it is also possible that a plurality of corresponding elements associated with the linear portion of interest in the sensing range corresponding to the to-be-updated geo-key frame data are identified. Further, even if a corresponding element corresponding to the linear portion of interest in the sensing range corresponding to the to-be-updated geo-key frame data is identified, the matching reliability is low in some cases. In the cases as described above, the common environmental map data update unit 72 may not update the geo-pose data included in the to-be-updated geo-key frame data.

Further, in the present embodiment, for example, the common environmental map data update unit 72 updates, on the basis of the locations of two feature points updated as described above, the location in a common environmental map of a feature point disposed between the two feature points in the environmental map.

Here, for example, the common environmental map data update unit 72 may identify intermediate geo-key frame data that is geo-key frame data associated with each of two pieces of to-be-updated geo-key frame data through one or a plurality of different pieces of key frame link data.

Then, the common environmental map data update unit 72 may update geo-pose data included in the intermediate geo-key frame data, on the basis of geo-pose data included in each of the two pieces of to-be-updated geo-key frame data in question.

Here, for example, it is assumed that the node K(1) and the node K(n) illustrated in FIG. 6 are nodes corresponding to to-be-updated geo-key frame data. In this case, the node K(2) to the node K(n−1) are nodes corresponding to intermediate geo-key frame data and the node K(m) is not a node corresponding to intermediate geo-key frame data.

In the following, geo-pose data included in the to-be-updated geo-key frame data corresponding to the node K(1) is referred to as "first geo-pose data." Further, geo-pose data included in the to-be-updated geo-key frame data corresponding to the node K(n) is referred to as "second geo-pose data."

Then, the common environmental map data update unit 72 identifies an update amount dGP1 of the first geo-pose data and an update amount dGPn of the second geo-pose data.

For example, dGP1=Gp1′−Gp1 holds, where Gp1 is the value of the first geo-pose data before update and Gp1′ is the value of the first geo-pose data after update. Further, dGPn=Gpn′−Gpn holds, where Gpn is the value of the second geo-pose data before update and Gpn′ is the value of the second geo-pose data after update. Here, for example, the update amount of at least one of the latitude, the longitude, the altitude, the orientation, or the elevation/depression angle may be identified.

Then, the common environmental map data update unit 72 identifies a first distance that is the distance from a location indicated by geo-pose data included in the intermediate geo-key frame data (hereinafter referred to as "intermediate geo-pose data") to a location indicated by the first geo-pose data. Further, the common environmental map data update unit 72 identifies a second distance that is the distance from the location indicated by the intermediate geo-pose data to a location indicated by the second geo-pose data.

FIG. 6 illustrates a first distance d(1, 3) and a second distance d(3, n) for the intermediate geo-key frame data corresponding to the node K(3).

Then, the common environmental map data update unit 72 identifies an update amount that is the weighted average between the update amount dGP1 and the update amount dGPn with weights based on a first distance d1 and a second distance d2. Here, for example, an update amount dGP3 of the intermediate geo-key frame data corresponding to the node K(3) is identified by calculating an expression (d(3, n)×dGP1+d(1, 3)×dGPn)/(d(3, n)+d(1, 3))).

Then, the common environmental map data update unit 72 updates the intermediate geo-pose data by the update amount identified as described above. For example, it is assumed that the value of intermediate geo-pose data included in the intermediate geo-key frame data corresponding to the node K(3), the value having not yet been updated, is GP3. In this case, the intermediate geo-pose data is updated in such a manner that the intermediate geo-pose data having a value GP3' takes GP3+dGP3.

The common environmental map data update unit 72 updates, not only the intermediate geo-key frame data corresponding to the node K(3), but also intermediate geo-pose data included in the other intermediate geo-key frame data.

Further, to achieve a match with the update of the geo-pose data included in the intermediate geo-key frame data, the common environmental map data update unit 72 also updates public pose data included in the intermediate geo-key frame data in question. Here, the public pose data included in the intermediate key frame data may be updated by an update amount depending on the update amount of the intermediate geo-pose data included in the intermediate key frame data in question. Also in this case, as described above, in updating the public pose data, processing of converting geo-pose data values expressed by the latitude, the longitude, the altitude, and the like to public pose data values expressed in metric units is executed. Further, as described above, a conversion with a conversion expression taking the fact that a length per longitude varies depending on the latitude into consideration is required to be executed. Note that, as described above, the orientation of the tracker 14 indicated by public pose data is not required to be updated on the basis of an orientation update amount indicated by geo-pose data and may be updated in such a manner that a specific direction (for example, the north) in the corresponding map and the direction of a predetermined axis (for example, the X axis or the Y axis) indicated by the public pose data are matched with each other. Further, the common environmental map data update unit 72 also updates delta pose data included in key frame link data having the geo-key frame ID of the intermediate geo-key frame data in question as its link source ID or link destination ID.

Figure 8A:
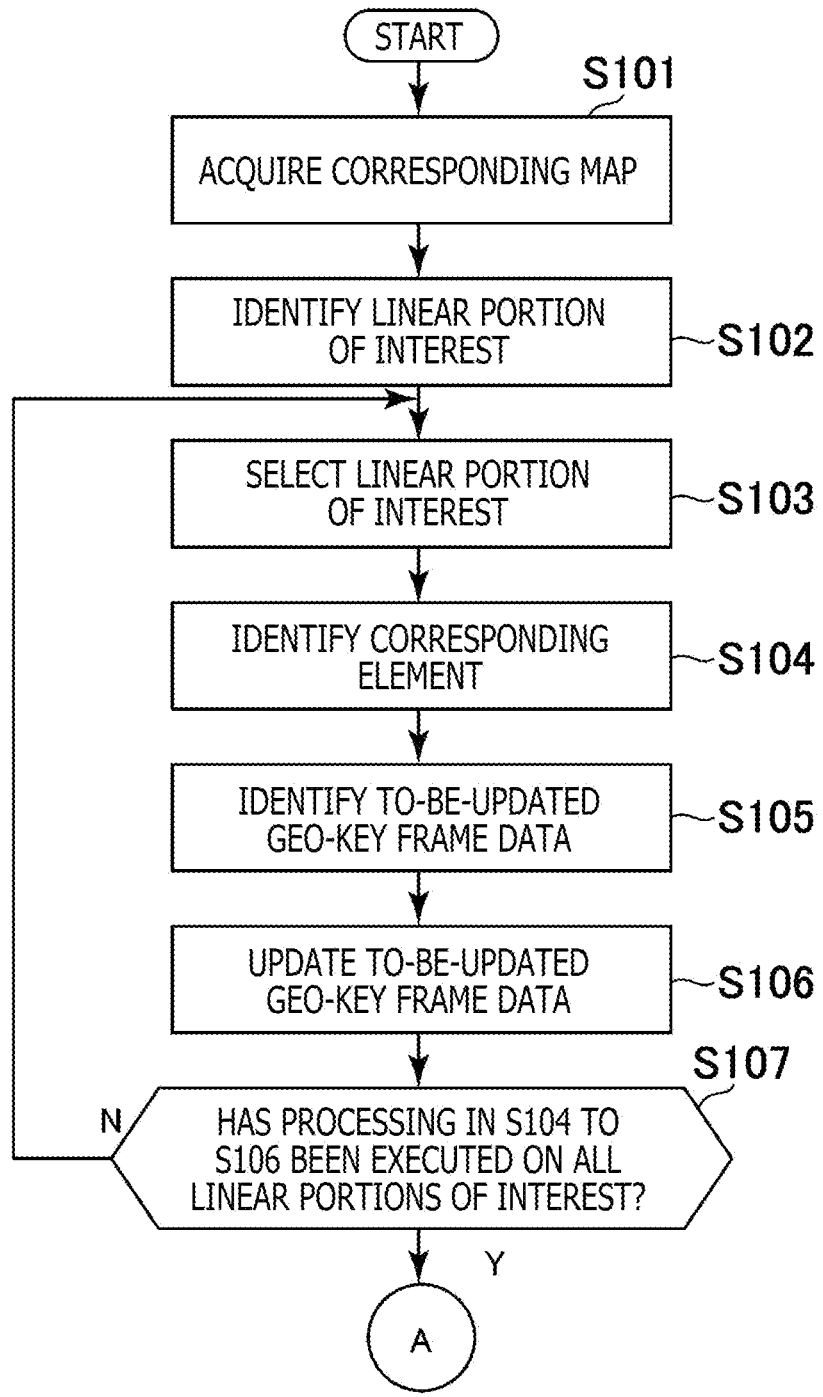
FIG. 8A is a flow chart illustrating an exemplary flow of processing that is performed in the common server according to the embodiment of the present invention.
Figure 8B:
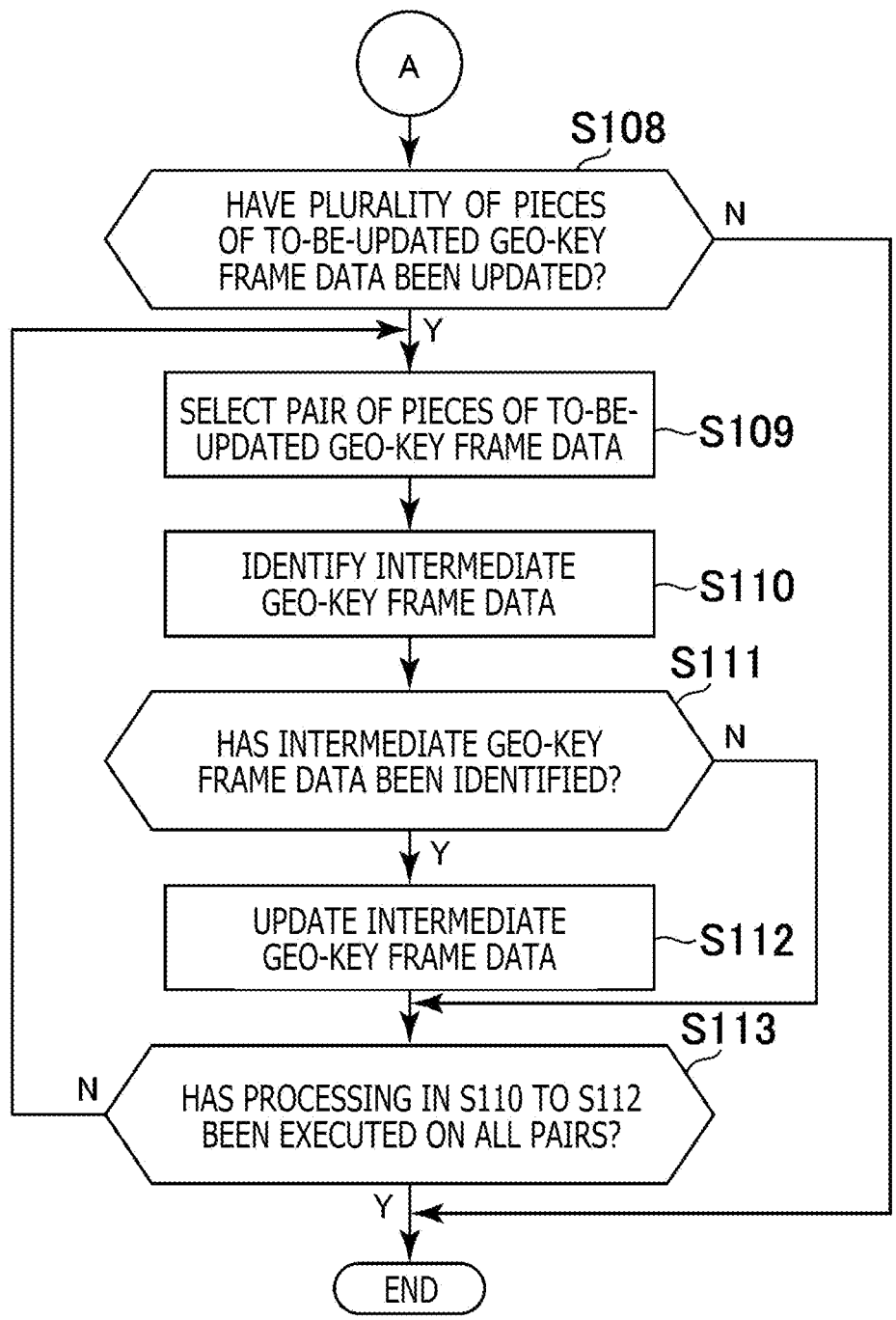
FIG. 8B is a flow chart illustrating the exemplary flow of processing that is performed in the common server according to the embodiment of the present invention.

Here, an exemplary flow of common environmental map data update processing that is performed in the common server 16 according to the present embodiment is described with reference to the flow charts of FIG. 8A and FIG. 8B.

First, the map service access unit 66 acquires the corresponding map from the map service 18 (S101).

Then, the pattern identification unit 68 identifies linear portions of interest in a common environmental map indicated by common environmental map data stored in the common environmental map data storage unit 64 (S102). Here, a plurality of linear portions of interest may be identified.

Then, the corresponding element identification unit 70 selects one linear portion of interest on which the processing in S104 to S106 has not been executed, among the linear portions of interest identified in the processing in S102 (S103).

Then, the corresponding element identification unit 70 identifies a corresponding element that appears in the corresponding map acquired in the processing in S101 and that is associated with the linear portion of interest selected in the processing in S103 (S104).

Then, the common environmental map data update unit 72 identifies, as to-be-updated geo-key frame data, geo-key frame data corresponding to a sensing range that covers whole or part of the linear portion of interest selected in the processing in S103 (S105). Here, a plurality of pieces of geo-key frame data may be identified as to-be-updated geo-key frame data.

Then, the common environmental map data update unit 72 updates, on the basis of the location in the corresponding map of the corresponding element identified in the processing in S104, one or the plurality of pieces of to-be-updated geo-key frame data identified in the processing in S105 (S106). In the processing in S106, for example, geo-pose data included in the to-be-updated geo-key frame data is updated.

Then, the corresponding element identification unit 70 confirms whether or not the processing in S104 to S106 has been executed on all the linear portions of interest identified in the processing in S102 (S107).

In a case where it is confirmed that the processing in S104 to S106 has not been executed on all the linear portions of interest identified in the processing in S102 (S107: N), the processing returns to S103.

In a case where it is confirmed that the processing in S103 to S106 has been executed on all the linear portions of interest identified in the processing in S102 (S107: Y), the common environmental map data update unit 72 confirms whether or not a plurality of pieces of to-be-updated geo-key frame data have been updated in the processing in S101 to S107 (S108).

In a case where it is confirmed that not a plurality of pieces of to-be-updated geo-key frame data have been updated (S108: N), the processing of this processing example ends.

Meanwhile, in a case where it is confirmed that a plurality of pieces of to-be-updated geo-key frame data have been updated (S108: Y), the common environmental map data update unit 72 selects one to-be-updated geo-key frame on which the processing in S110 to S112 has not been executed, among the pairs of to-be-updated geo-key frames that have been updated in the processing in S101 to S107 (S109).

Then, the common environmental map data update unit 72 identifies, as intermediate geo-key frame data, geo-key frame data associated with each of the pair of pieces of to-be-updated geo-key frame data that have been selected in the processing in S109 through one or a plurality of different pieces of key frame link data (S110). Here, a plurality of pieces of geo-key frame data may be identified as intermediate geo-key frame data.

Then, the common environmental map data update unit 72 confirms whether or not one or a plurality of pieces of intermediate geo-key frame data have been identified in the processing in S110 (S111). There may be a case where no key frame data is associated with each of the pair of to-be-updated geo-key frames that have been selected in the processing in S109 through one or a plurality of different pieces of key frame link data. In such a case, it is confirmed in the processing in S111 that no intermediate geo-key frame data has been identified.

In a case where it is confirmed in the processing in S111 that intermediate geo-key frame data has been identified (S111: Y), the common environmental map data update unit 72 updates one or the plurality of pieces of intermediate geo-key frame data that have been identified in the processing in S110 (S112). In the processing in S112, for example, geo-pose data included in the intermediate geo-key frame data is updated.

Then, the common environmental map data update unit 72 confirms whether or not the processing in S110 to S112 has been executed on all the pairs of to-be-updated geo-key frames that have been updated in the processing in S101 to S107 (S113).

Also in a case where it is confirmed in the processing in S111 that no intermediate geo-key frame data has been identified (S111: N), it is confirmed whether or not the processing in S110 to S112 has been executed on all the pairs of to-be-updated geo-key frames that have been updated in the processing in S101 to S107 (S113).

In a case where it is confirmed that the processing in S110 to S112 has not been executed on all the pairs of to-be-updated geo-key frames that have been updated in the processing in S101 to S107 (S113: N), the processing returns to S109.

Meanwhile, in a case where it is confirmed that the processing in S110 to S112 has been executed on all the pairs of to-be-updated geo-key frames that have been updated in the processing in S101 to S107 (S113: Y), the processing of this processing example ends.

When n pieces of to-be-updated geo-key frame data have been updated in the processing in S101 to S107, the processing in S109 to S112 is repeatedly executed n×(n−1)/2 times.

As described above, in the present embodiment, common environmental map data is corrected in such a manner that a predetermined pattern in the common environmental map is matched with the location of a linear element corresponding to the pattern in question in the corresponding map. Thus, according to the present embodiment, a common environmental map can be corrected to be accurately associated with the map indicated by the given map data provided by the given map service 18.

Further, with matching between the map at the macro level provided by the map service 18 and a common environmental map generated at the micro level as in the present embodiment, improvements in collection efficiency and accuracy of common environmental maps are expected.

Expected application examples of the present embodiment include various fields such as automatic operation, factory automation (FA), drone autopilot, and remote control or remote indication of equipment.

Note that the present invention is not limited to the embodiment described above.

Further, the above concrete character strings and numerical values and the concrete character strings and numerical values in the drawings are illustrative, and the present invention is not limited to those character strings and numerical values.

The invention claimed is:

1. An environmental map management apparatus comprising:
    a memory configured to
        store environmental map data that is generated based on sensing data acquired by a tracker and indicates an environmental map,
        store the environmental map data indicating the environmental map including a plurality of feature points; and
    processing circuitry configured to
    identify a predetermined pattern in the environmental map on a basis of the environmental map data,
    identify a linear element that appears in a map indicated by given map data provided by a given map service and is associated with the pattern,
    update the environmental map data on a basis of a location of the linear element in the map indicated by the given map data,
    update, based on the location of the linear element in the map indicated by the given map data, a location of at least one of the feature points in the environmental map,
    wherein the environmental map data includes a plurality of pieces of key frame data each generated based on the sensing data,
    wherein the key frame data includes geo-pose data indicating a geographical location and an orientation of the tracker and a plurality of pieces of feature point data indicating relative locations, with respect to the location and the orientation indicated by the geo-pose data, of the feature points different from each other,
    identify the key frame data associated with the linear element as to-be-updated key frame data, and
    update, based on the location of the linear element in the map indicated by the given map data, the geo-pose data included in the to-be-updated key frame data.

2. The environmental map management apparatus according to claim 1, wherein the processing circuitry is further configured to
    identify a linear portion in the environmental map on the basis of the environmental map data, and
    identify a linear element that appears in the map indicated by the given map data and that is associated with the linear portion.

3. The environmental map management apparatus according to claim 1, wherein the processing circuitry is further configured to
    identify a linear set of feature points linearly disposed, from the plurality of feature points,
    identify a linear element that appears in the map indicated by the given map data and that is associated with the linear set of feature points, and
    update, based on the location of the linear element in the map indicated by the given map data, a location of the linear set of feature points in the environmental map.

4. The environmental map management apparatus according to claim 1, wherein the processing circuitry is further configured to
    update, based on locations of two of the feature points, the locations being updated based on the location of the linear element in the map indicated by the given map data, a location in the environmental map of one of the feature points disposed between the two of the feature points in the environmental map.

5. The environmental map management apparatus according to claim 1, wherein the processing circuitry is further configured to
    store the environmental map data indicating the environmental map including a plurality of feature points,
    map the plurality of feature points on a plane orthogonal to a gravity axis, to thereby generate mapping data indicating a set of feature points on the plane, and
    identify the predetermined pattern on a basis of the mapping data.

6. The environmental map management apparatus according to claim 1, wherein the processing circuitry is further configured to
    update at least one of a latitude, a longitude, an altitude, an orientation, or an elevation/depression angle of each of the feature points.

7. The environmental map management apparatus according to claim 1,
    wherein the environmental map data further includes key frame link data for associating two pieces of the key frame data partially overlapping with each other in terms of sensing range by the tracker with each other,
    wherein the processing circuitry is further configured to
    identify intermediate key frame data that is the key frame data associated with each of two pieces of the to-be-updated key frame data through one or a plurality of different pieces of the key frame link data, and update, based on the geo-pose data included in each of the two pieces of the to-be-updated key frame data, the geo-pose data included in the intermediate key frame data.

8. The environmental map management apparatus according to claim 7, wherein the processing circuitry is further configured to identify an update amount of first geo-pose data that is the geo-pose data included in one of the pieces of the to-be-updated key frame data, identify an update amount of second geo-pose data that is the geo-pose data included in the other of the pieces of the to-be-updated key frame data, identify a first distance that is a distance from a location indicated by intermediate geo-pose data that is the geo-pose data included in the intermediate key frame data to a location indicated by the first geo-pose data, identify a second distance that is a distance from the location indicated by the intermediate geo-pose data to a location indicated by the second geo-pose data, and update the intermediate geo-pose data by an update amount that is a weighted average between the update amount of the first geo-pose data and the update amount of the second geo-pose data with weights based on the first distance and the second distance.

9. The environmental map management apparatus according to claim 1, wherein the key frame data further includes public pose data indicating the location and the orientation of the tracker expressed in metric units, and wherein the processing circuitry is further configured to update, based on the location of the linear element in the map indicated by the given map data, the geo-pose data and the public pose data included in the to-be-updated key frame data.

10. The environmental map management apparatus according to claim 9, wherein the environmental map data further includes key frame link data for associating two pieces of the key frame data partially overlapping with each other in terms of sensing range by the tracker with each other, wherein the processing circuitry is further configured to identify intermediate key frame data that is the key frame data associated with each of two pieces of the to-be-updated key frame data through one or a plurality of different pieces of the key frame link data, and update, based on the geo-pose data included in each of the two pieces of the to-be-updated key frame data, the geo-pose data and the public pose data included in the intermediate key frame data.

11. The environmental map management apparatus according to claim 10, wherein the processing circuitry is further configured to identify an update amount of first geo-pose data that is the geo-pose data included in one of the pieces of the to-be-updated key frame data, identify an update amount of second geo-pose data that is the geo-pose data included in the other of the pieces of the to-be-updated key frame data, identify a first distance that is a distance from a location indicated by intermediate geo-pose data that is the geo-pose data included in the intermediate key frame data to a location indicated by the first geo-pose data, identify a second distance that is a distance from the location indicated by the intermediate geo-pose data to a location indicated by the second geo-pose data, update the intermediate geo-pose data by an update amount that is a weighted average between the update amount of the first geo-pose data and the update amount of the second geo-pose data with weights based on the first distance and the second distance, and update the public pose data included in the intermediate key frame data by an update amount depending on the update amount of the intermediate geo-pose data included in the intermediate key frame data.

12. The environmental map management apparatus according to claim 1, wherein the geo-pose data indicates at least one of a latitude, a longitude, an altitude, an orientation, or an elevation/depression angle of the tracker.

13. An environmental map management method comprising:

identifying, based on environmental map data that is generated based on sensing data acquired by a tracker and indicates an environmental map, a predetermined pattern in the environmental map;

identifying a linear element that appears in a map indicated by given map data provided by a given map service and is associated with the pattern;

updating the environmental map data on a basis of a location of the linear element in the map indicated by the given map data;

updating, based on the location of the linear element in the map indicated by the given map data, a location of at least one of the feature points in the environmental map, wherein the environmental map data includes a plurality of pieces of key frame data each generated based on the sensing data, wherein the key frame data includes geo-pose data indicating a geographical location and an orientation of the tracker and a plurality of pieces of feature point data indicating relative locations, with respect to the location and the orientation indicated by the geo-pose data, of the feature points different from each other, identifying the key frame data associated with the linear element as to-be-updated key frame data; and updating, based on the location of the linear element in the map indicated by the given map data, the geo-pose data included in the to-be-updated key frame data.

14. A non-transitory computer-readable storage medium storing computer-readable instructions thereon which, when executed by a computer, cause the computer to perform a method, the method comprising:

identifying, based on environmental map data that is generated based on sensing data acquired by a tracker and indicates an environmental map, a predetermined pattern in the environmental map;

identifying a linear element that appears in a map indicated by given map data provided by a given map service and is associated with the pattern;

updating the environmental map data on a basis of a location of the linear element in the map indicated by the given map data;

updating, based on the location of the linear element in the map indicated by the given map data, a location of at least one of the feature points in the environmental map, wherein the environmental map data includes a plurality of pieces of key frame data each generated based on the sensing data, wherein the key frame data includes geo-pose data indicating a geographical location and an orientation of the tracker and a plurality of pieces of feature point data indicating relative locations, with respect to the location and the orientation indicated by the geo-pose data, of the feature points different from each other, identifying the key frame data associated with the linear element as to-be-updated key frame data; and updating, based on the location of the linear element in the map indicated by the given map data, the geo-pose data included in the to-be-updated key frame data.

* * * * *